Patented Feb. 27, 1923.

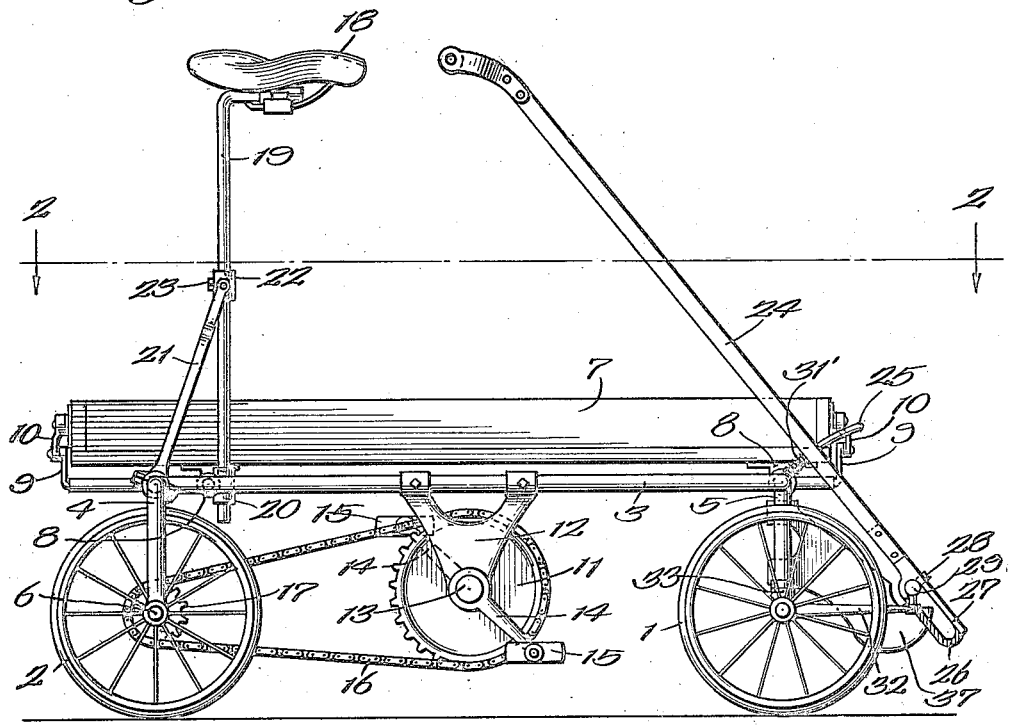
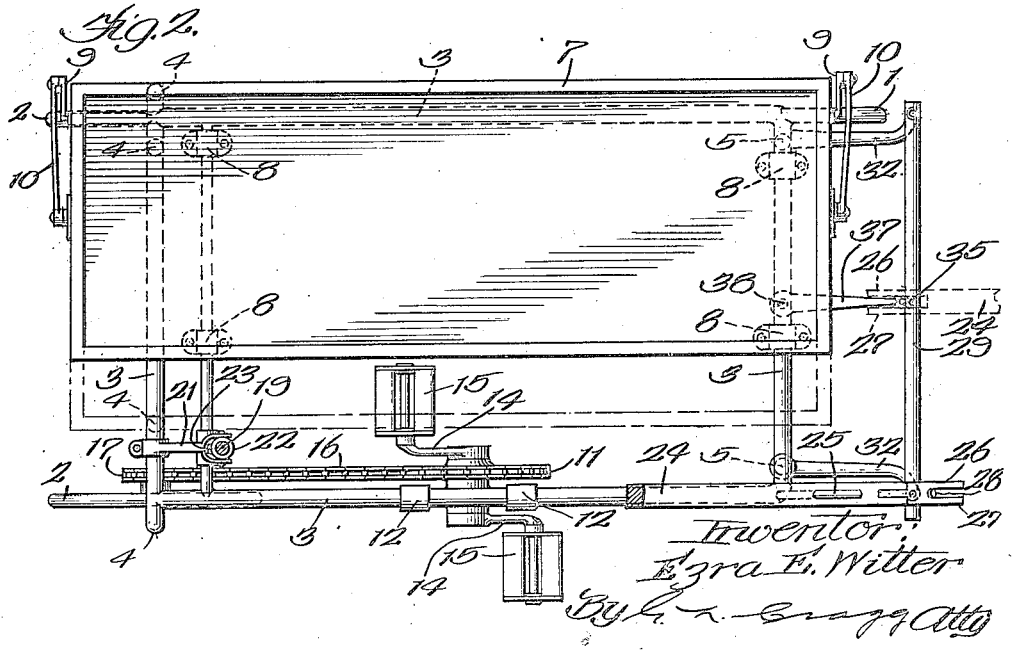

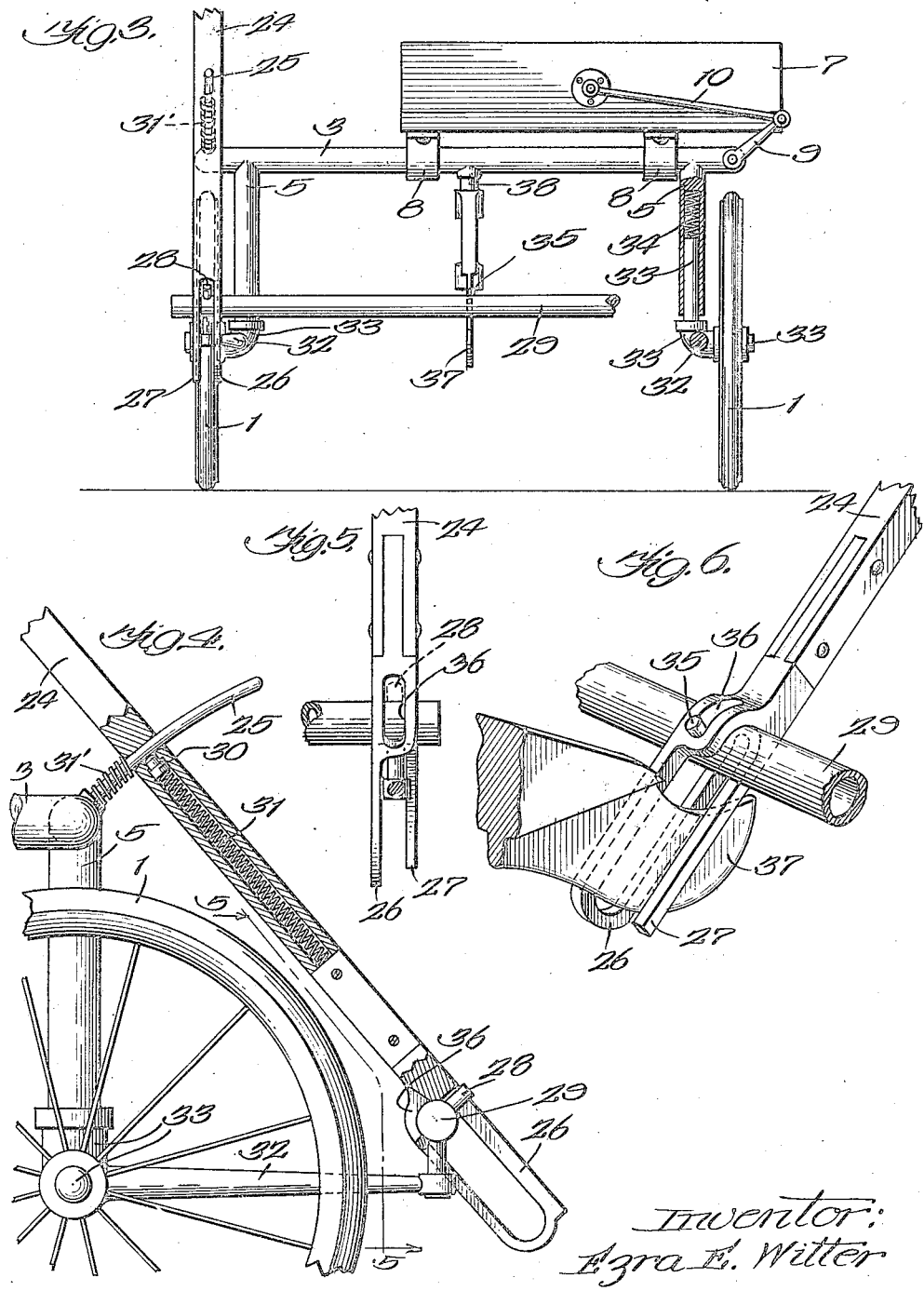

1,446,682

UNITED STATES PATENT OFFICE.

EZRA E. WITTER, OF ZION CITY, ILLINOIS, ASSIGNOR OF ONE-THIRD TO JUDSON POST, OF ZION CITY, ILLINOIS.

WAGON.

Application filed March 29, 1920. Serial No. 369,546.

*To all whom it may concern:*

Be it known that I, EZRA E. WITTER, citizen of the United States, residing at Zion City, in the county of Lake and State of Illinois, have invented a certain new and useful Improvement in Wagons, of which the following is a full, clear, concise, and exact description.

My invention relates to wagons and mainly resides in providing mechanism whereby a wagon may be converted from one which is pulled to one which is driven or vice versa.

In carrying out the general object of my invention I employ preferably two steering vehicle wheels upon which the wagon body is partially supported and a steering lever which is adjusted to a rearward position to steer the wagon when it is driven and which may be placed in a forward position to serve as a wagon tongue when the wagon is to be pulled. The steering wheels are mounted to turn upon stub shafts projecting horizontally from upright shafts which latter are journaled to turn upon their vertical axes, the elbows or knuckles of these angular shafts having stems projecting forwardly therefrom which are connected at their front ends by a link which causes said angular shafts to turn upon their upright axes to determine the planes of rotation of the steering wagon wheels that turn upon the horizontal branches of said angular shafts. When the steering lever is employed as such to direct the wagon when it is driven it is brought into connection with a fulcrum for it that enables it to transmit motion to the aforesaid link which in turn shifts the angular shafts upon their upright axes to change the planes of rotation of the steering vehicle wheels. When the steering lever is to be used merely to pull the wagon it is disconnected from its fulcrum and is thereafter separably connected with a rearward continuation that is to form a part thereof when the steering lever is used as a pulling tongue. This rear continuation of the tongue is fulcrumed upon the wagon frame at its rear end and swings bodily with the pulling tongue to impart motion to the link that connects the steering wheels and which has connection with the tongue.

In the preferred embodiment of the invention the means for driving the wagon includes pedal mechanism in driving connection with one or more driving wagon wheels at the rear of the wagon. This pedal mechanism is conveniently located upon one side of the wagon where the pedal part thereof is carried by one side of the wagon frame. In order that this pedal mechanism may not unduly increase the width of the entire structure I make the wagon frame hollow to afford access to one of the pedals which is below the space enclosed by the frame. This is made accessible by shifting the wagon body laterally for the purpose of uncovering the inner pedal to make it accessible to one of the legs of the person driving the wagon. The side of the wagon frame where the pedal structure is disposed carries a seat post that supports a seat for the driver that is in position to enable the driver to reach the pedals when the wagon body is moved to one side.

I will explain my invention more fully by reference to the accompanying drawings showing the preferred embodiment thereof and in which Fig. 1 is a side view of a wagon embracing the various characteristics of my invention; Fig. 2 is a sectional plan view on line 2—2 of Fig. 1, one position of the wagon body being shown in full lines and another in dot and dash lines, the steering lever being indicated in full lines when serving as a steering lever and in dotted lines when the lever is to serve as a wagon pulling tongue; Fig. 3 is a front view of the wagon as it appears in full lines in Fig. 2, parts being broken away and parts being shown in section; Fig. 4 is a side view of the front portion of the structure, parts being broken away and shown in section; Fig. 5 is a sectional view on line 5—5 of Fig. 4; and Fig. 6 is a perspective view illustrating the steering lever when adjusted to serve as a wagon pulling tongue.

Like parts are indicated by similar characters of reference throughout the different figures.

The wagon illustrated has four wheels, there being preferably two front wheels 1 serving as steering wheels and two rear wheels 2 as trailing vehicle wheels which may also serve as propelling wheels.

The hollow horizontal rectangular wagon frame 3 is supported upon two pairs of rear posts 4 and two front posts 5. Each trailing vehicle wheel 2 is mounted to turn upon a short shaft 6 carried at the lower ends of each pair of posts 4, each wheel 2 preferably turning in a fixed plane with respect to the wagon structure as a whole. A wagon body 7 is carried by the wagon frame 3 and has eyes 8 secured to its bottom side which receive the front and rear sides of the frame 3, on which frame sides these eyes are slidable to permit the wagon body to be adjusted transversely of the frame. The wagon body is maintained in parallelism with the frame in its different adjusted positions by means of the parallel link mechanism inclusive of links 9 pivoted to the frame 3 and the links 10 connected with the links 9 and pivoted to the wagon body 7. The purpose of effecting the lateral adjustment of the wagon body with respect to the frame supporting it is to afford access to the wagon propelling means which, at least in part, underlies the wagon body when such propelling means are not in service.

The propelling means which I prefer to employ is in the form of pedal mechanism in gear connection with one of the trailing wheels 2, the other rear wheel 2 freely rotating upon its own shaft and with respect to the driven wheel 2 readily to enable the wagon to be turned from a straight course. The pedal mechanism illustrated is inclusive of a sprocket wheel 11 mounted in a hanger 12 that depends from the frame 3. The sprocket shaft 13 is in fixed relation with the sprocket wheel and there are fixed on this shaft two pedal cranks 14 having pedals 15 at their outer ends. The sprocket chain 16 passes over the sprocket wheel 11 and also over a sprocket wheel 17 in fixed relation with just one of the two rear vehicle wheels 2, for the reason hitherto stated. When the wagon is to be propelled the wagon body is shifted to the position illustraed by full lines in Fig. 2, in which position the inner pedal 15 is uncovered to enable one leg of the operator to work upon the inner pedal and in the space between the wagon body and the side of the wagon frame carrying the pedal mechanism.

The operator may be provided with a saddle 18 supported upon a seat post 19 which is carried upon the wagon frame. This seat post, together with the saddle support thereon, may be adjustably held in relation to the frame 3 to permit the seat post and the saddle to be collapsed into a substantially horizontal position for the purpose of shipment of the wagon. To this end the lower end of the seat post is stepped into a support 20 rotatably mounted upon the wagon frame and the post is connected with another part of the wagon frame by means of a link 21 pivoted at its lower end upon the frame and at its upper end carrying a sleeve 22 through which the seat post passes, this sleeve 22 being provided with a set bolt 23 for the purpose of clamping the sleeve upon the post to secure the post in its upright position, the post being collapsible to a horizontal position when said set bolt is loosened.

When the wagon is adjusted to be propelled the steering lever 24 is placed in the position indicated by full lines in Figs. 1 to 5 inclusive. The steering lever has an opening extending transversely therethrough which is penetrated by an arcuate fulcrum post 25 carried upon the front corner portion of the wagon frame 3 upon the same side of such frame with the pedal mechanism. The lower end of the lever is provided with two spaced apart arms 26, 27 which are disconnected at their lower ends to receive therebetween a pin 28 carried upon a link rod 29 upon which the steering lever 24 is supported at the upper ends of the arms 26, 27, the curvature of the arcuate post 25 being concentric with the axis of the link 29. The steering lever is frictionally held in the forward or backward position to which it is adjusted by means of a friction plunger 30 that is housed within the steering lever and which is pressed against the same by means of a coiled spring 31 also housed within said lever. A coiled spring 31' surrounds the fulcrum post 25 and is positioned between the front part of the wagon frame and the steering lever whereby this lever is cushioned to make it easier for the operator to handle it, this spring pressing forwardly upon the lever. The link rod 29 is pivotally connected with the forward ends of stems 32 which are rigidly connected at their rear ends with angular shafts 33 upon whose outside horizontal branches the steering vehicle wheels 1 are mounted to turn and whose upright or vertical branches are housed within the front posts 5 which are made hollow not only to accommodate the upright branches of the angular shafts 33 but also to house cushioning springs 34 which engage the upper ends of the upright branches of angular shafts 33 to cushion these shafts and the wheels 1 mounted thereon. By the mechanism illustrated the link 29 may readily be laterally adjusted to turn the angular shafts 33 upon their upright axes to change the planes of the steering vehicle wheels 1 whereby the direction of travel of the wagon may be readily regulated.

When the wagon is to be drawn or pulled the steering lever is moved forwardly out of engagement with the arcuate post 25 and sufficiently further to place the arms 26, 27 upon the lower side of the lever to uncouple the lever and the pin 28 whereafter the lever may be shifted laterally to a mid-position upon the link 29 at which point the lever is adjusted to cause the pin 35 upon the link rod 29 to enter the slot 36 in the lever. In this same adjusting movement of the lever an added extension 37 thereof is brought between the arms 26 and 27 to move with the lever in the lateral adjusting movements thereof. The lever extension 37 is fulcrumed at 38 upon the front side of the wagon frame 3, this being the manner of fulcruming the entire lever when it is to serve the purpose of a wagon tongue whereby the wagon may be pulled and steered as it is being pulled. When the lever, acting as a tongue, is moved laterally, the pin 35 will be pushed upon in one direction or the other to cause correspondingly laterally adjusting movements of the link rod 29 to adjust the planes of rotation of the steering vehicle wheels 1 to determine the direction in which the wagon is being pulled. The connection between the lever 24 and its extension 37 is such that the major portion of the lever may be swung forwardly and backwardly with respect to its extension 37 without in any manner interfering with the adjustments which this lever, acting as a wagon tongue, may have upon the link rod 29 and the steering wheels 1. I desire to claim this feature irrespective of the use of the tongue as a steering lever when the wagon is propelled.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A wagon including a frame therefor; two angular shafts having upright branches journaled in the front portion of the wagon frame and also having substantially horizontal branches; two steering vehicle wheels, one upon the horizontal branch of each angular shaft; stems projecting from said angular shafts; a link rod connecting said stems; a steering lever; a fulcrum post upon the wagon frame for the steering lever along which the steering lever may be moved to adjust the forward and backward positions of the steering lever; means for connecting the steering lever with the link rod so that as said steering lever is laterally turned upon its fulcrum the link rod will be shifted to change the planes of rotation of the steering wheel; and a spring cushion between the steering lever and the wagon frame pressing forwardly upon the steering lever.

2. A wagon including a frame therefor; two angular shafts having upright branches journaled in the front portion of the wagon frame and also having substantially horizontal branches; two steering vehicle wheels, one upon the horizontal branch of each angular shaft; stems projecting from said angular shafts; a link rod connecting said stems; a steering lever; a fulcrum post upon the wagon frame for the steering lever along which the steering lever may be moved to adjust the forward and backward positions of the steering lever; means for connecting the steering lever with the link rod so that as said steering lever is laterally turned upon its fulcrum the link rod will be shifted to change the planes of rotation of the steering wheel; a spring cushion between the steering lever and the wagon frame pressing forwardly upon the steering lever; and friction means for holding the steering lever in selected positions upon the fulcrum post.

In witness whereof, I hereunto subscribe my name this 20th day of March, A. D., 1920.

EZRA E. WITTER.